(12) United States Patent
Hasegawa et al.

(10) Patent No.: US 9,488,783 B2
(45) Date of Patent: Nov. 8, 2016

(54) SWITCH APPARATUS

(71) Applicant: FURUKAWA ELECTRIC CO., LTD., Tokyo (JP)

(72) Inventors: Junichi Hasegawa, Tokyo (JP); Noritaka Matsubara, Tokyo (JP); Kazutaka Nara, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/877,605

(22) Filed: Oct. 7, 2015

(65) Prior Publication Data

US 2016/0025930 A1    Jan. 28, 2016

Related U.S. Application Data (63) Continuation of application No. PCT/JP2014/001847, filed on Mar. 28, 2014.

(30) Foreign Application Priority Data

Apr. 8, 2013  (JP) ................................. 2013-080443

(51) Int. Cl.
*G02B 6/293* (2006.01)
*G02B 6/122* (2006.01)
(Continued)

(52) U.S. Cl.
CPC ............ *G02B 6/29355* (2013.01); *G02B 6/122* (2013.01); *G02B 6/1223* (2013.01); *G02B 6/29383* (2013.01); *G02B 6/3546* (2013.01); *G02F 1/3137* (2013.01);
(Continued)

(58) Field of Classification Search
CPC ............ G02B 6/29355; G02B 6/3546; G02B 6/29383; G02F 1/3137; G02F 2001/311; G02F 2001/212
See application file for complete search history.

(56) References Cited

U.S. PATENT DOCUMENTS

| 5,892,864 A | 4/1999 | Stoll et al. |
| 2007/0104409 A1* | 5/2007 | Nara ................... G02B 6/12007 385/14 |
| 2015/0172794 A1 | 6/2015 | Hasegawa et al. |

FOREIGN PATENT DOCUMENTS

| JP | 10-303862 A | 11/1998 |
| JP | 2000-137254 A | 5/2000 |

(Continued)

OTHER PUBLICATIONS

Nakamura, S., et al., "Current Status and Future Prospect of Silicon Photonic Switching Devices," *IEICE*, 2013, pp. SS13-SS14.

(Continued)

*Primary Examiner* — Ryan Lepisto
(74) *Attorney, Agent, or Firm* — Oblon, McClelland, Maier & Neustadt, L.L.P.

(57) ABSTRACT

An object of the present invention is to provide a switch unit for optical signals which is capable of reducing an area required for arrangement and reducing manufacturing costs, and a switch apparatus including the switch unit. A switch unit 30 according to one embodiment of the present invention includes two optical switch arrays 34a, 34b arranged to face in opposite directions and in parallel on a substrate. The two optical switch arrays extend along a surface of a chip, and each have four optical switches 31 arranged in parallel. Such a configuration makes it possible to reduce the size of the switch unit because in an excess region of one of the optical switch array, the other optical switch array is disposed.

12 Claims, 6 Drawing Sheets

(51) Int. Cl.
*G02B 6/35* (2006.01)
*G02F 1/313* (2006.01)
*G02F 1/21* (2006.01)
*G02F 1/31* (2006.01)
*G02B 6/12* (2006.01)

(52) U.S. Cl.
CPC ............... *G02B 2006/1215* (2013.01); *G02B 2006/12145* (2013.01); *G02B 2006/12159* (2013.01); *G02F 2001/212* (2013.01); *G02F 2001/311* (2013.01)

(56) References Cited

FOREIGN PATENT DOCUMENTS

| JP | 2003-207668 A | 7/2003 |
| WO | WO 2014/049942 A1 | 4/2014 |

OTHER PUBLICATIONS

Watanabe, A., et al., "Optical Path Cross-Connect System Architecture Suitable for Large Scale Expansion," *Journal of Lightwave Technology*, 1996, vol. 14, No. 10, pp. 2162-2172.

Nagase, R., et al., "Silica-Based 8x8 Optical Matrix Switch Module with Hybrid Integrated Driving Circuits and Its System Application," *Journal of Lightwave Technology*, 1994, vol. 12, No. 9, pp. 1631-1639.

International Search Report issued Jul. 1, 2014 for PCT/JP2014/001847 filed on Mar. 28, 2014 with English Translation.

Written Opinion issued Jul. 1, 2014 for PCT/JP2014/001847 filed on Mar. 28, 2014.

* cited by examiner

SWITCH APPARATUS

CROSS-REFERENCES TO RELATED APPLICATIONS

This application is a continuation application of International Application No. PCT/JP2014/001847, filed Mar. 28, 2014, which claims the benefit of Japanese Patent Application No. 2013-080443, filed Apr. 8, 2013. The contents of the aforementioned applications are incorporated herein by reference in their entireties.

TECHNICAL FIELD

The present invention relates to a switch apparatus for optical signals, and particularly to a switch apparatus used for branching and inserting optical signals in a wavelength division multiplexing transmission.

BACKGROUND ART

To increase the speed and capacity of optical communications, a ROADM (Reconfigurable Optical Add/Drop Multiplexer) technology has recently been devised. An optical network of the ROADM uses a wavelength division multiplexing transmission system, and is capable of branching and inserting optical signals having any wavelengths without converting the optical signals to electrical signals. In addition, in the optical network of the ROADM, when changing, newly adding, or removing a route through which an optical signal of each wavelength should pass, it is possible to change the route, that is, to reconfigure the route (reconfigurable), without conducting works such as a connecting work.

Achieving the ROADM requires a switch apparatus (also called a multi-cast switch) capable of inputting and outputting a plurality of wavelengths and also capable of changing routes. Specifically, the switch apparatus used for the ROADM has a function of receiving an input of an optical signal from a client device and inserting the optical signal into a pathway of the ROADM network as well as a function of outputting to the client device an optical signal branched from a pathway of the ROADM network. The switch apparatus is capable of dynamically changing a route through which an optical signal passes.

Figure 9:
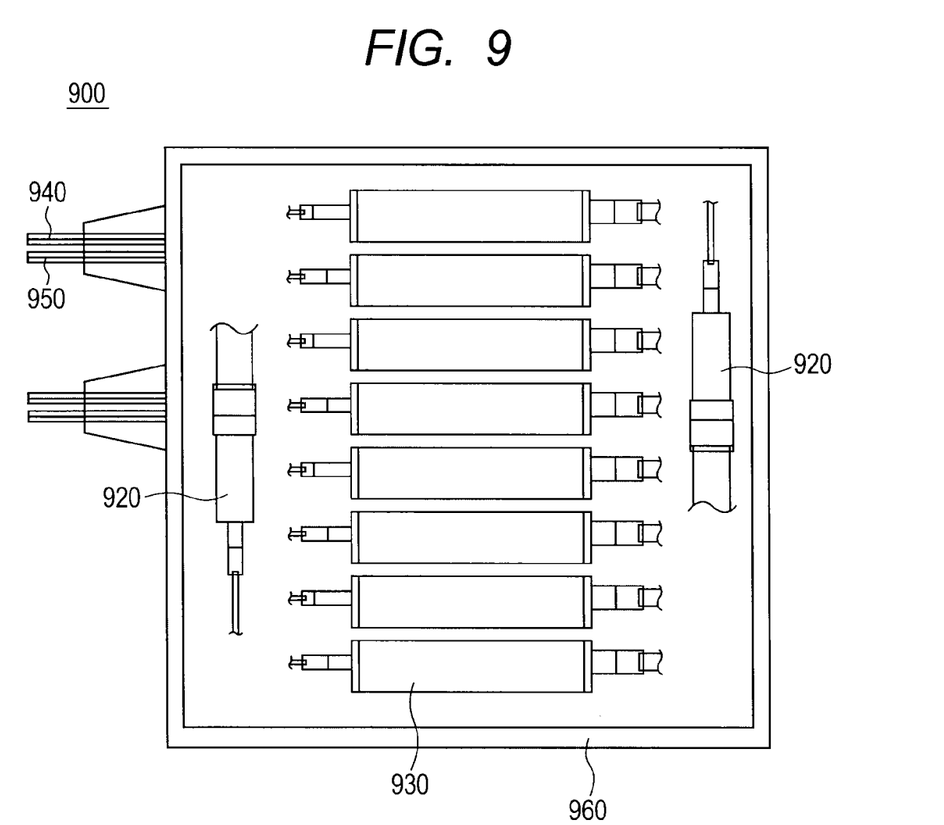
FIG. 9 is a top view of a conventional switch apparatus.

FIG. 9 is a top view of one example of a switch apparatus 900 used for the ROADM. The switch apparatus 900 has two sets of configurations in each of which the number of routes (the number of pathways) on the ROADM network side is 8 and the number of routes (the number of wavelengths) on the client device side is 16. The switch apparatus 900 includes two splitter units 920 and eight switch units 930 in a housing 960. Each of the splitter units 920 includes a predetermined number of optical splitters, and each of the switch units 930 includes a predetermined number of optical switches. One end of each splitter unit 920 is connected to the ROADM network through a network-side fiber 940, and the other end thereof is branched to be connected to one ends of the switch units 930. Moreover, the other end of each switch unit 930 is connected to a client device through a client-side fiber 950. Meanwhile, FIG. 9 does not illustrate wiring among the splitter units 920, the switch units 930, the network-side fibers 940, and the client-side fibers 950, for the sake of simplification. Such configuration allows for branching and insertion of optical signals between the ROADM network and the client device.

Desired numbers of pathways and wavelengths can be obtained by changing the numbers of the splitter units 920 and the switch units 930 included in the switch apparatus 900, as well as, the number of branches of the optical splitters included in each splitter unit 920 and the number of branches of the optical switches included in each switch unit 930.

In the switch apparatus 900 illustrated in FIG. 9, to increase the number of supported wavelengths, the number of the switch units 930 needs to be increased. This increases the area required to arrange the switch apparatus 900, and also increases manufacturing costs due to increases in the amounts of materials required for the manufacture. To handle a larger number of wavelengths, there are demands for reduction in size and reduction in costs of a switch apparatus.

SUMMARY OF INVENTION

Technical Problem

The present invention has been made in view of the above-described problem, and an object of the present invention is to provide a switch unit for optical signals which is capable of reducing an area required for arrangement and reducing manufacturing costs, and a switch apparatus including the switch unit.

Solution to Problem

One aspect of the present invention includes a switch unit for selecting a route for an inputted optical signal and outputting the optical signal, the switch unit including: a substrate; and first and second optical switch arrays each including an optical switch which includes one common port configured to input and output the optical signal, a plurality of branch ports each configured to input and output the optical signal, a plurality of waveguides connecting the common port and the branch ports, and a plurality of Mach-Zehnder interferometers (MZIs) provided on the waveguides, and which extends along a surface of the substrate, in which a first direction which is from the common port to the branch ports of the optical switch included in the first optical switch array and a second direction which is from the common port to the branch ports of the optical switch included in the second optical switch array are arranged to face opposite to each other and in parallel.

Advantageous Effects of Invention

According to the present invention, since the two optical switch arrays are arranged to face in opposite directions from each other and in parallel in the switch unit, it is possible to reduce the area of the switch unit and reduce the manufacturing costs.

DESCRIPTION OF EMBODIMENTS

Hereinafter, embodiments of the present invention will be described with reference to the drawings. However, the present invention is not limited to the embodiments. Note that in the drawings described below, components having the same functions are denoted by the same reference numerals, and redundant descriptions therefor are omitted in some cases.

(First Embodiment)

Figure 1:
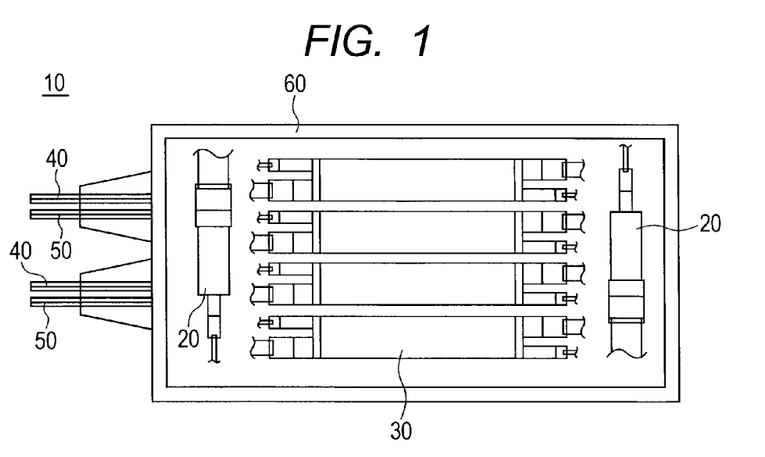
FIG. 1 is a schematic configuration diagram of a switch apparatus according to one embodiment of the present invention.

FIG. 1 is a schematic configuration diagram of a switch apparatus 10 according to this embodiment. The switch apparatus 10 is capable of being connected between a ROADM network having a plurality of pathways, and a plurality of client devices. This allows the switch apparatus 10 to branch an optical signal from a pathway of the ROADM network to a desired client device, or to insert a signal from a client device into a desired pathway of the ROADM network.

The switch apparatus 10 includes two splitter units 20 and four switch units 30. The splitter units 20 and the switch units 30 are housed in a housing 60. One end of each splitter unit 20 is connected to the ROADM network through a network-side fiber 40, and the other end thereof is branched to be connected to one ends of a plurality of the switch units 30. Moreover, the other end of each switch unit 30 is connected to the client device through a client-side fiber 50. Meanwhile, FIG. 1 does not illustrate wiring among the splitter units 20, the switch units 30, the network-side fibers 40, and the client-side fibers 50, for the sake of simplification.

Figure 2:
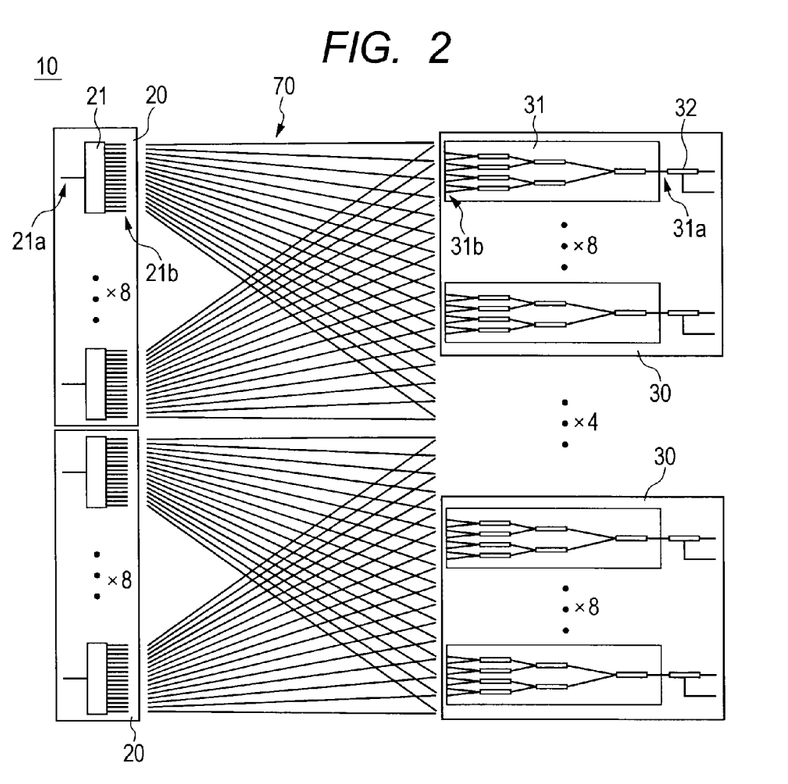
FIG. 2 is a schematic diagram of the switch apparatus according to the one embodiment of the present invention.

FIG. 2 is a schematic diagram illustrating a wiring system of the switch apparatus 10. Each splitter unit 20 includes eight optical splitters 21 on one chip (substrate). The optical splitter 21 used in this embodiment is a 1×16 optical splitter having one common port 21a at one end and sixteen branch ports 21b at the other end. An optical signal inputted from the common port 21a is divided into the branch ports 21b to be outputted therefrom. Alternatively, optical signals inputted from the respective branch ports 21b are joined into the common port 21a to be outputted therefrom. Each splitter unit 20 is manufactured by using a PLC formed on a quartz substrate, for example, and has a relative refractive index difference Δ of approximately 0.4% between the core and the cladding. Using such a low relative refractive index difference Δ enables the connection loss to be reduced.

Each switch unit 30 includes: eight optical switches 31 each provided on one chip (substrate); and tap couplers connected to the respective optical switches 31. Although as described later, the optical switches 31 are arranged such that a set of four optical switches 31 and a set of four optical switches 31 are alternately arranged to face in opposite directions, the optical switches 31 are illustrated in FIG. 2 as facing in the same direction for the sake of convenience. Each optical switch 31 used in this embodiment is a 1×8 optical switch having one common port 31a at one end and eight branch ports 31b at the other end. An optical signal inputted from the common port 31a is outputted to one of the branch ports 31b depending on control. Alternatively, an optical signal inputted from each branch port 31b is outputted to the common port 31a, or is not outputted but discarded, depending on control. Each switch unit 30 is manufactured by using a PLC formed on a silicon substrate, for example, and has a relative refractive index difference Δ of approximately 1.5% between the core and the cladding. Using such a high relative refractive index difference Δ enables the size to be reduced. To increase the number of wavelengths which the switch apparatus 10 can handle, it is necessary to increase the number of the optical switches 31 included in each switch unit 30, or to increase the number of the switch units 30 themselves. For this reason, the size of each switch unit 30 is reduced by adjusting the switch unit 30 at a high relative refractive index difference Δ, so as to reduce the arrangement space for the switch apparatus 10.

Note that although Ge is generally used as a dopant for increasing the refractive index of the core, another dopant, such as Zr, that can further increase the refractive index may be used instead. This can increase the relative refractive index difference Δ between the core and the cladding to approximately 5% (2.5% to 12%), thus making it possible to further reduce the size of the switch unit 30.

Each tap coupler 32 has one common port at one end and two branch ports at the other end. The common port of the tap coupler 32 is connected to the common port 31a of the optical switch 31. One of the two branch ports of the tap coupler 32 is connected to the client-side fiber 50, and the other is connected to a PD (not illustrated). Using the PD enables an optical output in the optical switch 31 to be monitored. Although the tap coupler 32 may have any branching ratio, 5% is branched to the PD side in this embodiment.

The branch ports 21b of the optical splitters 21 and the branch ports 31b of the optical switches 31 are connected through a shuffle fiber array 70 having a plurality of three-dimensionally intersecting optical fibers and fiber arrays formed on both ends of the optical fibers. In FIG. 2, only some of the optical fibers included in the shuffle fiber array 70 are schematically illustrated for the sake of simplification.

Figure 3:
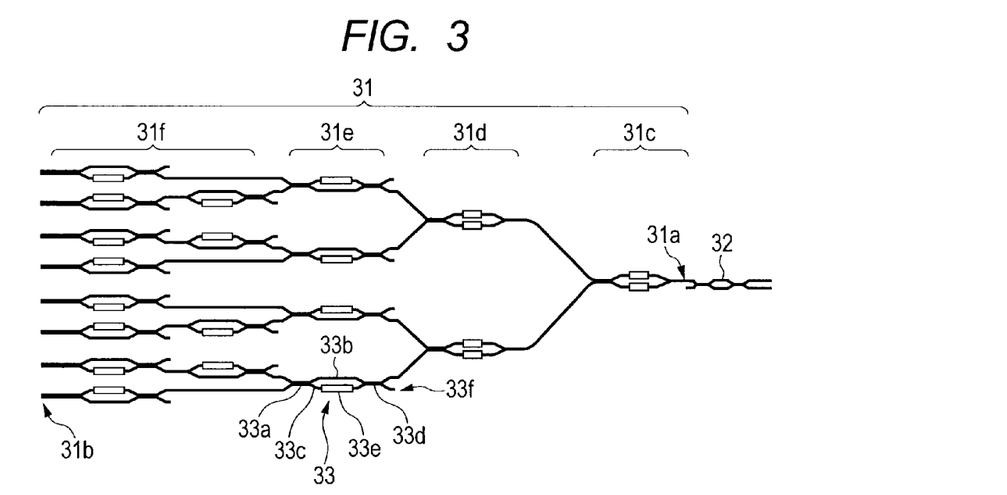
FIG. 3 is a schematic diagram of an optical switch according to the one embodiment of the present invention.

FIG. 3 is a schematic diagram illustrating a configuration of the optical switch 31. The optical switch has one common port 31a at one end and eight branch ports 31b at the other end. The optical switch 31 has a plurality of Mach-Zehnder interferometers (MZIs) 33 connected in cascade.

Each MZI 33 has one or two input ports at one end and one or two output ports at the other end. Note that since the MZI 33 does not have directionality, the names, the input port and the output port are only for differentiation, and both of the input port and the output port can be used for input and output. The MZI 33 is provided, between the input ports and the output ports, with two couplers (directional couplers in this embodiment) 33a, 33d and two waveguides 33b, 33c disposed between the two couplers. In addition, a heater 33e serving as heating means is provided near at least one of the two waveguides 33b, 33c. As the coupler included in the MZI 33, not only the DC (directional coupler), but also a WINO (wavelength-insensitive coupler), a Y branch, and the like may be used in accordance with characteristics.

The MZI 33 is adjusted such that when heating is not performed by the heater 33e, an optical signal inputted from one of the two input ports is outputted from one of the two output ports. When one of the two waveguides 33b, 33c is heated by the heater 33e, the transmission rate of light in the heated waveguide is decreased, changing such that the optical signal is outputted from the other of the two output ports. For this reason, it is possible to select from which one of the two output ports, a signal inputted from the input port is outputted, by controlling on and off of heating of the heater 33e. Each heater 33e is connected to electrode pads 35a, 35b, which will be described later, by any desired wiring method. Whether or not the heating is performed by the heater 33e can be switched by controlling, through a not-illustrated control unit, whether or not electric power is supplied to the heater 33e through the electrode pads 35a, 35b. Such a configuration makes it possible to dynamically change the route through which the optical signal passes in the optical switch 31.

As described above, each optical switch 31 includes the plurality of MZIs 33 connected in cascade. In a first stage 31c of the optical switch 31, as seen from the common port 31a side, one MZI 33 is provided. The tap coupler 32 is connected to one of two input ports of this MZI 33, and two output ports of this MZI 33 are connected respectively to input ports of two MZIs 33 in a second stage 31d. Output ports (four in total) of the two MZIs 33 in the second stage 31d are connected to input ports of four MZIs 33 in a third stage 31e. Output ports (eight in total) of the four MZIs 33 in the third stage 31e are connected to a gate switch unit 31f. In the gate switch unit 31f, one MZI 33 is connected to one of the two output ports of each MZI 33 in the third stage 31e, and two MZIs 33 are connected in series to the other. The gate switch unit 31f makes it possible to increase the extinction ratio even when no power is supplied.

Figure 4A:
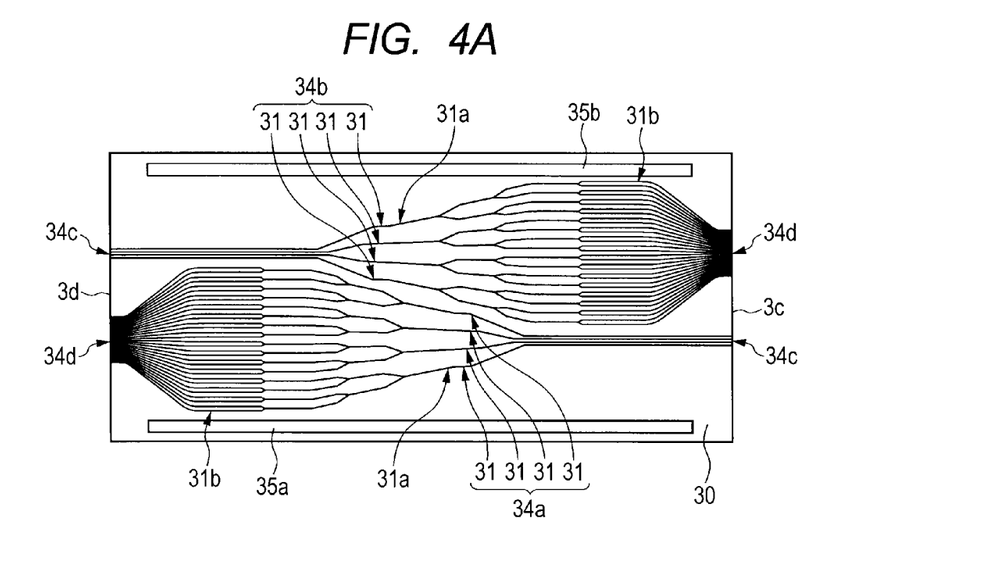
FIG. 4A is a top view of a switch unit according to the one embodiment of the present invention.

FIG. 4A is a top view of the switch unit 30 according to this embodiment. The switch unit 30 includes two optical switch arrays 34a, 34b arranged to face in opposite directions and in parallel on one chip (substrate). The optical switch arrays 34a, 34b extend along a surface of the chip, and each have four optical switches 31 arranged in parallel. In other words, the four optical switches 31 included in each of the optical switch arrays 34a, 34b are arranged such that all the common ports 31a are aligned on one side and all the branch ports 31b are aligned on the other side. The common port 31a of each optical switch 31 is connected to a common terminal 34c provided at one end of the optical switch array 34a, 34b, and the branch ports 31b of each optical switch 31 are connected to a branch terminal 34d provided at the other end of the optical switch array 34a, 34b. The common terminal 34c of the first optical switch array 34a and the branch terminal 34d of the second optical switch array 34b are provided on a side face 3c of the switch unit 30, and the branch terminal 34d of the first optical switch array 34a and the common terminal 34c of the second optical switch array 34b are provided on a side face 3d of the switch unit 30, which is opposite to the side face 3c.

Note that the number of the optical switches 31 included in one optical switch array 34a, 34b is not limited to four, and may be any number equal to or more than one. In addition, the optical switches 31 included in the optical switch arrays 34a, 34b may not have the same configuration, and may have different configurations from one another. Moreover, the optical switch arrays 34a, 34b may have different configurations from each other.

Here, the arrangement in which the first optical switch array 34a and the second optical switch array 34b are arranged to face in opposite directions and in parallel will be described in detail. The first optical switch array 34a and the second optical switch array 34b are arranged such that the direction from the common terminal 34c toward the branch terminal 34d of the first optical switch array 34a and the direction from the common terminal 34c toward the branch terminal 34d of the second optical switch array 34b are opposite to each other. In other words, the direction from the common port 31a toward the branch port 31b of each optical switch 31 included in the first optical switch array 34a and the direction from the common port 31a toward the branch port 31b of each optical switch 31 included in the second optical switch array 34b are opposite to each other.

A large number of the waveguides and MZIs 33 are disposed on the branch terminal 34d side of each optical switch array 34a, 34b (namely, on the branch ports 31b side of the optical switches 31). To prevent heat generated by the heater 33e of a certain MZI 33 from influencing the operation of another MZI 33, the MZIs 33 need to be arranged away from one another at a certain distance. On the other hand, a small number of the waveguides and MZIs 33 are disposed on the common terminal 34c side of each optical switch array 34a, 34b (namely, on the common ports 31a side of the optical switches 31). For this reason, excess regions where the waveguides or the MZIs 33 are not disposed are formed on the common terminal 34c side of each optical switch array 34a, 34b.

In the switch unit 30 according to this embodiment, as illustrated in FIG. 4A, each optical switch array 34a, 34b has a shape tapering from the branch terminal 34d toward the common terminal 34c, and excess regions exist in such a manner as to sandwich the tip portion of the shape from the opposite sides. In view of this, the first optical switch array 34a and the second optical switch array 34b are arranged to face in opposite directions and the tip portions thereof are placed in proximity. In this way, the excess regions formed on the common terminals 34c side of the respective optical switch arrays 34a, 34b are overlapped. As a result, the second optical switch array 34b is disposed in the excess region on the common terminal 34c side of the first optical switch array 34a, and the first optical switch array 34a is disposed in the excess region on the common terminal 34c side of the second optical switch array 34b. With this configuration, disposing the switch arrays 34a, 34b in regions that conventionally become excess regions makes it possible to reduce the size of the switch unit 30 and to thus reduce the manufacturing costs.

Moreover, in the switch unit 30 according to this embodiment, since the optical switch arrays 34a, 34b are arranged to face in opposite directions, the heaters 33e included in the MZIs 33 are not concentrated in one portion of the chip but distributed. For this reason, heat generated at the time of activating the switch unit 30 is distributed over the entire chip, and thus it is possible to dissipate heat by using heat dissipating fins more efficiently than the case where heat is concentrated on one portion.

The switch unit 30 further includes two electrode pads 35a, 35b arranged in such a manner as to sandwich the optical switch arrays 34a, 34b along a longitudinal direction of the optical switch arrays 34a, 34b (a direction connecting the common terminal 34c and the branch terminal 34d). The first electrode pad 35a on the first optical switch array 34a side is electrically connected to the first optical switch array 34a, and the second electrode pad 35b on the second optical switch array 34b side is electrically connected to the second optical switch array 34b. Each electrode pad 35a, 35b is electrically connected to the heaters 33e included in the corresponding optical switches 31, serving as an electric power supply passage for the heaters 33e. Moreover, each electrode pad 35a, 35b is connected to an electrode external to the switch unit 30.

In a conventional switch unit, electrode pads are provided on the opposite sides of one optical switch array, and the electrode pads are connected respectively to external electrodes provided on the opposite sides of the switch unit. For this reason, the external electrodes provided on the opposite sides of the switch unit also cause an increase of the area required to arrange the switch unit. By contrast, in the switch unit 30 according to this embodiment, the electrode pads 35a, 35b are provided on the opposite sides of the two optical switch arrays 34a, 34b, and each of the electrode pads 35a, 35b is connected to the external electrode. In other words, the external electrode is required only on one side for one optical switch array. Therefore, it is possible to reduce the number of external electrodes required for each single optical switch array as compared to the conventional one, and thus it is possible to further reduce the area required to arrange the switch unit.

Figure 4B:
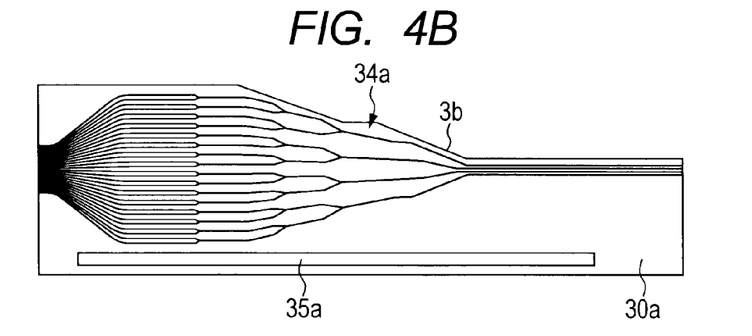
FIG. 4B is a top view of the switch unit according to the one embodiment of the present invention.

The first electrode pad 35a is connected only to the first optical switch array 34a, and the second electrode pad 35b is connected only to the second optical switch array 34b. For this reason, the switch unit 30 can be divided between the first optical switch array 34a and the second optical switch array 34b. FIG. 4B is a top view of a partial switch unit 30a obtained by dividing the switch unit 30 into two. The partial switch unit 30a is formed by cutting the switch unit 30 in FIG. 4A along a cutting face 3b between the two optical switch arrays 34a, 34b. Note that although FIG. 4B illustrates only the configuration on the first optical switch array 34a side, the configuration on the second optical switch array 34b side is also the same. Two partial switch units 30a each having such a configuration are combined and arranged to face in opposite directions, which can be utilized as one switch unit 30. Note that the partial switch unit 30a does not necessarily have to be formed by cutting the switch unit 30, and the partial switch unit 30a may be manufactured at the beginning.

The switch unit 30 illustrated in FIG. 4A includes the optical switch arrays 34a, 34b on one chip. For this reason, if a defect in manufacture occurs in one of the optical switch arrays 34a, 34b, the other one having no defect is also wasted. By contrast, the partial switch unit 30a illustrated in FIG. 4B includes only one optical switch array 34a (or 34b) on one chip. For this reason, it is possible to discard only the optical switch array 34a (or 34b) in which a defect has occurred, thus allowing for an improvement in yield.

(Second Embodiment)

In the first embodiment, the size of the switch unit is reduced by utilizing excess regions formed on the common terminals 34c sides of the optical switch arrays 34a, 34b to arrange the optical switch arrays 34a, 34b to face in the opposite directions from each other. However, excess regions on the sides where the optical switch arrays 34a, 34b are not disposed (the sides of the electrode pads 35a, 35b) are left unutilized. In this embodiment, the shapes of the optical switch arrays 34a, 34b are changed to more efficiently utilize the excess regions, thereby further reducing the area of the switch unit 30.

Figure 5A:
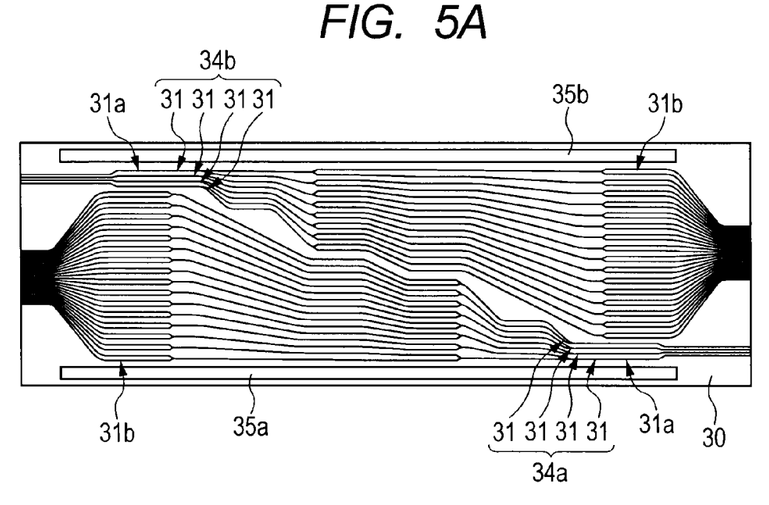
FIG. 5A is a top view of a switch unit according to one embodiment of the present invention.
Figure 5B:
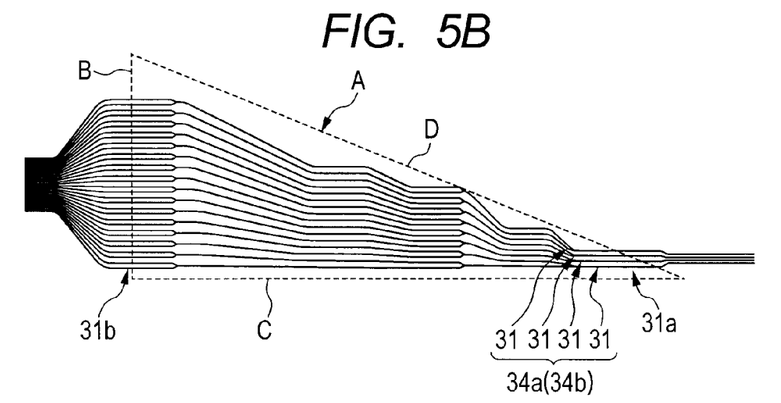
FIG. 5B is a top view of the switch unit according to the one embodiment of the present invention.

FIG. 5A is a top view of a switch unit 30 according to this embodiment. Although having a similar configuration to that of the first embodiment, the switch unit 30 according to this embodiment is different in the shapes of the optical switch arrays 34a, 34b. Each of the optical switch arrays 34a, 34b according to this embodiment has a shape of a substantially right triangle. Specifically, as illustrated in FIG. 5B, branch ports 31b (thirty-two in total) of four optical switches 31 included in each optical switch array 34a, 34b are aligned along a base B of a right triangle A. Waveguides of the optical switch array 34a, 34b extend in a region between a perpendicular C and a hypotenuse D. Common ports 31a (four in total) of the four optical switches 31 are located near an apex formed by the perpendicular C and the hypotenuse D. In addition, like the first embodiment, the first optical switch array 34a and the second optical switch array 34b are arranged to face in opposite directions.

In the optical switch array 34a, 34b according to this embodiment, the waveguides and the MZIs 33 are located closer to each other on the perpendicular C side of the right triangle A (on the side where the electrode pad 35a, 35b is provided). For this reason, the excess regions where the waveguides or the MZIs 33 are not disposed are placed together on the hypotenuse D side of the right triangle A, and not large excess regions are generated on the side where the electrode pad 35a, 35b is provided. The first optical switch array 34a and the second optical switch array 34b each having such a configuration are arranged to face in opposite directions and in parallel in such a manner as to be located in the excess regions of the counterparts to reduce excess regions where the waveguides or the MZIs are not disposed in the switch unit 30, thus making it possible to further reduce the area of the switch unit 30 more than the first embodiment.

The switch unit 30 according to this embodiment may be divided between the first optical switch array 34a and the second optical switch array 34b as illustrated in FIG. 4B into partial switch units 30a.

(Third Embodiment)

In the optical switch 31 described in FIG. 3, when an optical signal inputted from the branch port 31b is not to be outputted to the common port 31a, a control device controls the heater 33e of one of the MZIs 33, causing the inputted optical signal to be outputted to an output port 33f (called a dummy output port) that is not connected to the common port 31a. Although not described in FIG. 3, a waveguide (called a dummy waveguide) is desirably provided for guiding an optical signal that is not to be outputted to the common port 31a to the outside of the switch unit 30 from the dummy output port 33f. This embodiment defines a preferable form of the dummy waveguide.

Figure 6:
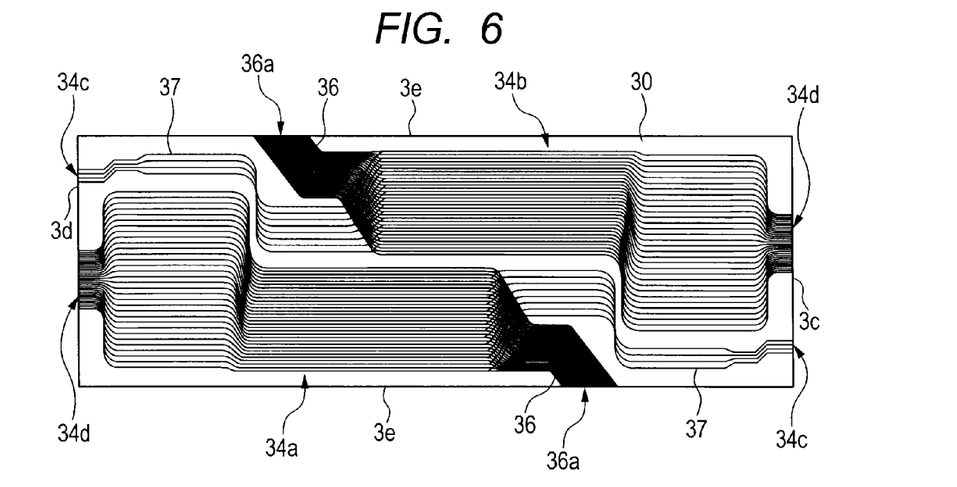
FIG. 6 is a top view of a switch unit according to one embodiment of the present invention.

FIG. 6 is a top view of a switch unit 30 according to this embodiment. Each of optical switch arrays 34a, 34b according to this embodiment includes a dummy waveguide 36 which is a collection of waveguides extending from the dummy output ports 33f of the respective MZIs 33. The portion of each optical switch array 34a, 34b, except the dummy waveguide 36, that is, a signal waveguide 37 which is a collection of waveguides connecting the branch ports 31b and the common port 31a has a shape of a substantially right triangle like the second embodiment. The dummy waveguides 36 are connected respectively to dummy terminals 36a provided on side faces 3e adjacent to the side face 3c and the side face 3d on each of which the common terminal 34c and the branch terminal 34d are provided.

The width of the switch unit 30 in a direction orthogonal to the longitudinal direction (the direction connecting the common terminal 34c and the branch terminal 34d) depends on the sum of the width near the common terminals 34c and the width near the branch terminals 34d of the optical switch arrays 34a, 34b. If the dummy waveguide 36 is connected to the common terminals 34c, a large number of waveguides are disposed near the common terminals 34c. For this reason, the width near the common terminal 34c of each optical switch array 34a, 34b is increased, resulting in an increase in the width of the entire switch unit 30. By contrast, in the switch unit 30 according to this embodiment, the dummy waveguide 36 is connected to the dummy terminal 36a provided on the side face 3e different from the side faces 3c, 3d on which the common terminal 34c is provided. This makes it possible to reduce the width near the common terminal 34c of each optical switch array 34a, 34b, thereby further reducing the size of the entire switch unit 30.

(Fourth Embodiment)

When a route for an optical signal is selected in the optical switch 31 illustrated in FIG. 3, heat is generated from the heater 33e of one of the MZIs 33 included in the optical switch 31 to change the branching ratio of the optical signal in the MZI 33. In this event, the heat is sometimes transferred also to the MZI 33 adjacent to the MZI 33 concerned, thus changing also the branching ratio of the MZI 33 which actually should not be driven. This phenomenon is called thermal interference. To prevent the thermal interference, the MZIs 33 may be sufficiently spaced away from one another. This however causes a problem of an increase in the size of the optical switch 31. By contrast, in this embodiment, the arrangement of the MZIs 33 is devised to suppress the thermal interference and also reduce the size of the optical switch 31.

Figure 7:
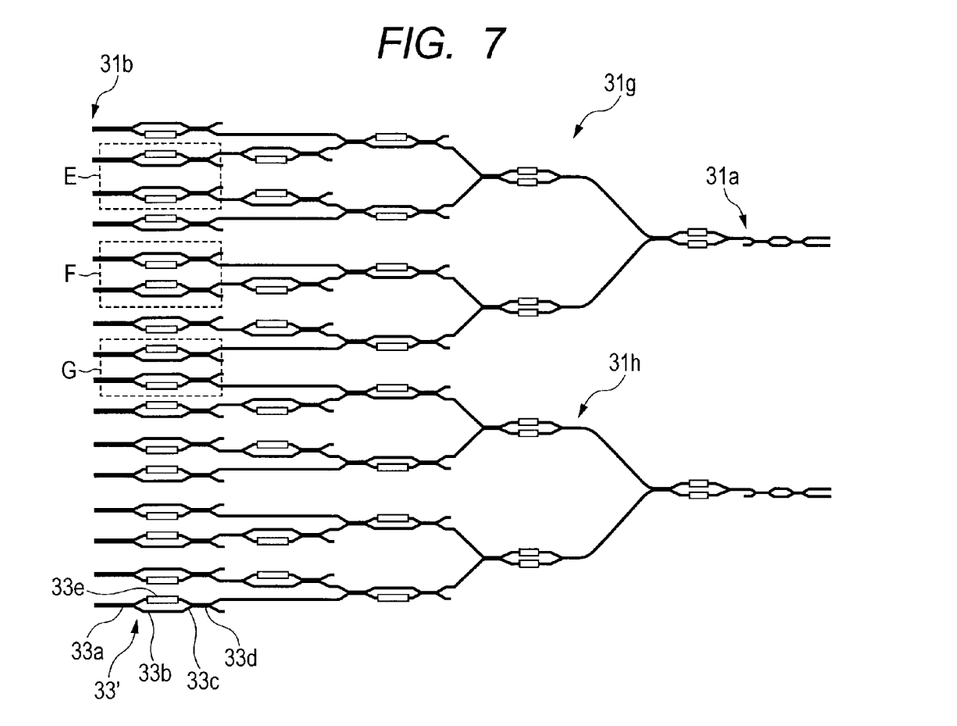
FIG. 7 is a schematic diagram of an optical switch according to one embodiment of the present invention.

FIG. 7 is a schematic diagram illustrating a configuration of optical switches 31g, 31h according to this embodiment which are adjacent to each other. Although having a similar configuration to the optical switch 31 illustrated in FIG. 3, each of the optical switches 31g, 31h is different in the arrangement of the MZIs 33. Although the optical switches 31g, 31h adjacent to each other will be described here, another optical switch adjacent to these may also have a similar configuration and arrangement.

This embodiment defines the arrangement of MZIs 33' aligned at positions closest to the branch port 31b among a plurality of MZIs 33 included in the optical switches 31g, 31h. This is because the MZIs 33 are densely disposed on the branch port 31b side of the optical switches 31g, 31h, and are thus likely to be influenced by the thermal interference. In each of the MZI 33', among two waveguides sandwiched by couplers 33a, 33d, one provided with no heater 33e is called a first waveguide 33b, and the other provided with the heater 33e is called a second waveguide 33c. Note that it is also possible to employ a configuration in which each of the first waveguide 33b and the second waveguide 33c is provided with the heater 33e, and only the heater 33e provided in the second waveguide 33c is driven (heated) while the heater 33e provided in the first waveguide 33b is not driven (heated). In such a configuration, since what is addressed in this embodiment is generation of heat, it is deemed that heating means (heater 33e) is not provided in the first waveguide 33b while the heating means (heater 33e) is provided in the second waveguide 33c.

Each of the optical switches 31g, 31h is configured such that the first waveguides 33b and the second waveguides 33c of the MZIs 33' adjacent to each other are arranged in an alternating manner. Specifically, when a certain MZI 33' is such that the first waveguide 33b and the second waveguide 33c are arranged in this order in a certain direction, an MZI 33' adjacent to the certain MZI 33' is such that the second waveguide 33c and the first waveguide 33b are arranged in this order in the certain direction. In addition, the optical switches 31g, 31h are configured such that in the MZI 33' that is included in the optical switch 31g and is closest to the optical switch 31h and the MZI 33' that is included in the optical switch 31h and is closest to the optical switch 31g, the first waveguides 33b provided with no heaters 33e are adjacent to each other.

Figure 8A:
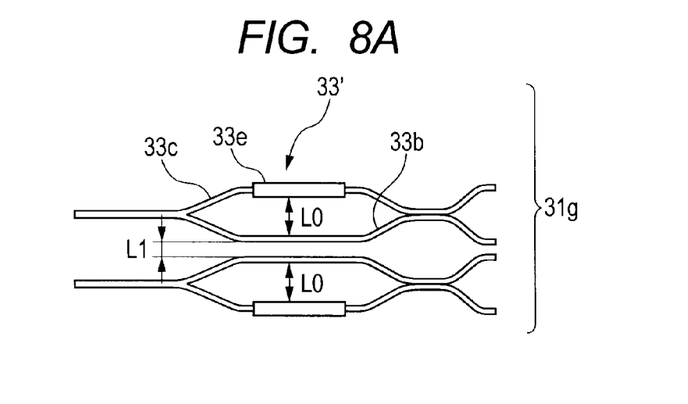
FIG. 8A is a diagram illustrating a portion where MZIs are adjacent to each other according to one embodiment of the present invention.
Figure 8B:
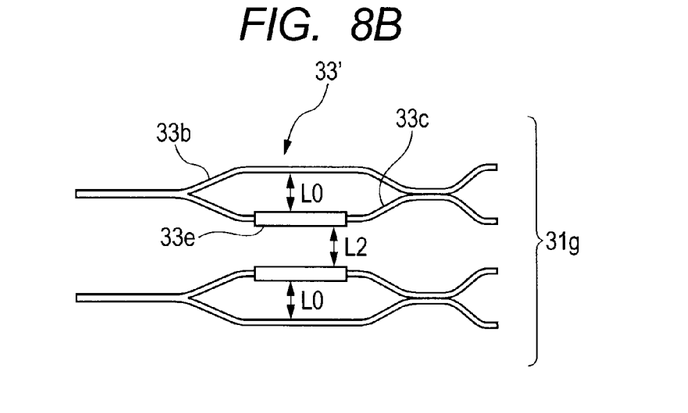
FIG. 8B is a diagram illustrating a portion where MZIs are adjacent to each other according to one embodiment of the present invention.
Figure 8C:
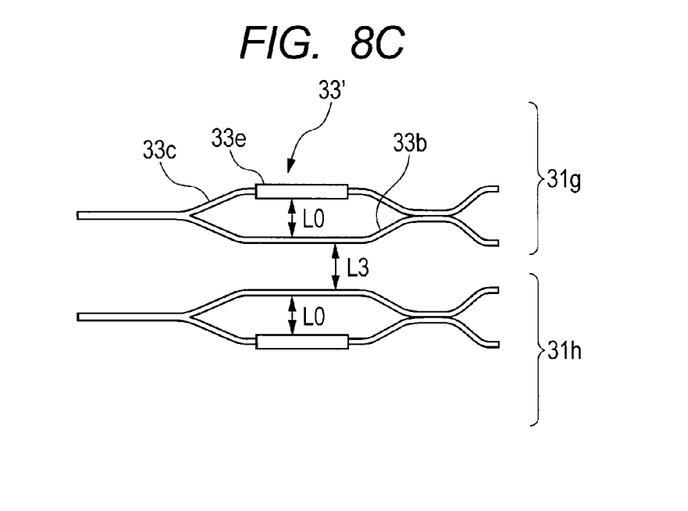
FIG. 8C is a diagram illustrating a portion where MZIs are adjacent to each other according to one embodiment of the present invention.

FIGS. 8A, 8B, and 8C are enlarged views of portions indicated by E, F, and G in FIG. 7, respectively, and each illustrate a portion where the MZIs 33' are adjacent to each other. In FIGS. 8A to 8C, the first waveguide 33b and the second waveguide 33c in the MZI 33' are separated from each other by L0. L0 is a distance necessary to provide a predetermined optical path length difference to two waveguides, which enables route selection using the MZI. A specific value of L0 may be obtained through experiments or computer simulation.

FIG. 8A illustrates a portion where the first waveguides 33b provided with no heaters 33e are adjacent to each other in two MZIs 33' that are adjacent to each other in the optical switch 31g (the same is applied to 31h), where the first waveguides 33b are separated from each other by L1. On the other hand, FIG. 8B illustrates a portion where the second waveguides 33c provided with the heaters 33e are adjacent to each other in two MZIs 33' that are adjacent to each other in the optical switch 31g (the same is applied to 31h), where the second waveguides 33c are separated from each other by L2. In FIG. 8A, since the heaters 33e are separated from each other, heat generated by the heater 33e of one of the MZIs 33' is unlikely to cause the thermal interference in the other MZI 33'. On the other hand, in FIG. 8B, since the heaters 33e are close to each other, heat generated by the heater 33e of one of the MZIs 33' is likely to cause the thermal interference in the other MZI 33'. In this embodiment, L2 is adjusted to a distance that does not cause, or is less likely to cause, the thermal interference even when one of the heaters 33e adjacent to each other is heated, and takes a value of 80% of or nearly equal to L0, for example. A specific value of L2 may be obtained through experiments or computer simulation. L1 is smaller than L2, and takes a value more than or equal to a predetermined distance (for example, 15 μm) that does not cause waveguides to be coupled. Note that since a plurality of routes are not simultaneously passed through in one optical switch 31g (the same applies to 31h), the heaters 33e in the MZIs 33' adjacent to each other are never driven simultaneously. For this reason, even when the MZI 33' in which the heater 33e is driven causes more or less thermal interference in the MZI 33' adjacent thereto due to reduction of L1, the MZI 33' in which the heater 33e is not driven only eliminates an optical signal, resulting in less influence on the elimination characteristics.

FIG. 8C illustrates a portion where the optical switches 31g, 31h are adjacent to each other, and the first waveguides 33b are separated from each other by L3. As described above, in FIG. 8A, since the heaters 33e of the MZIs 33' adjacent to each other in one optical switch are never driven simultaneously, the first waveguides 33b may be placed close to each other. On the other hand, since the portion illustrated in FIG. 8C is where the optical switch 31g and the optical switch 31h, which operate independently, are adjacent to each other, the heater 33e of the MZI 33' in the optical switch 31g and the heater 33e of the MZI 33' in the optical switch 31h are sometimes heated simultaneously. For this reason, if the first waveguides 33b are placed close to each other as in FIG. 8A, there is a possibility that heat generated simultaneously by the two heaters 33e causes a large thermal interference. Moreover, the MZI 33' in which the heater 33e is heated is controlled to transmit an optical signal therethrough, and even slight thermal interference causes significant influence on the transmission characteristics. In this embodiment, L3 is adjusted to a distance that does not cause, or is less likely to cause, thermal interference even when the heaters 33e of the two MZIs 33' are heated simultaneously, and is 80% of or nearly equal to L0, for example. In addition, L3 is larger than L1. A specific value of L3 may be obtained through experiments or computer simulation.

As described above, since in each of the optical switches 31g, 31h according to this embodiment, the distance between the waveguides 33c provided with the heaters 33e adjacent to each other is set at a first distance that allows for suppressing thermal interference, it is possible to suppress thermal interference. At the same time, since the distance between the waveguides 33b provided with no heaters 33e adjacent to each other is set at a second distance smaller than the first distance, it is possible to reduce the size of each of the optical switches 31g, 31h. Moreover, the distance between the waveguides 33b in a portion where the optical switch 31g and the optical switch 31h are adjacent to each other is set at a third distance that allows for suppressing thermal interference, it is also possible to suppress thermal interference between the optical switches 31g, 31h adjacent to each other.

The optical switches 31g, 31h according to this embodiment may be utilized for the switch unit 30 and the partial switch unit 30a according to any of the first to third embodiments.

The present invention is not limited to the above-described embodiments, and may be modified as appropriate without departing from the gist of the present invention. For example, although each of the above-described embodiments illustrates a switch apparatus including sixteen 1×16 optical splitters and thirty-two 8×1 optical switches, the present invention is not limited to this configuration. In addition, any numbers of the optical splitters and the optical switches may be provided on one chip. Those skilled in the art may use an optical splitter and an optical switch having a required number of branches depending on the number of pathways and the number of wavelengths to be handled by a switch apparatus, and may arrange required numbers of these optical splitters and optical switches as in the above-described embodiments. Note that the MZIs are omitted for the visibility in FIGS. 4A, 4B, 5A, 5B and 6.

The invention claimed is:

1. A switch unit for selecting a route for an inputted optical signal and outputting the optical signal, the switch unit comprising:
   a substrate; and
   first and second optical switch arrays each including an optical switch which includes one common port configured to input and output the optical signal, a plurality of branch ports each configured to input and output the optical signal, a plurality of waveguides connecting the common port and the branch ports, and a plurality of Mach-Zehnder interferometers (MZIs) provided on the waveguides, and which extends along a surface of the substrate, wherein
   each of the first and second optical switch arrays has a shape tapering from the branch ports side toward the common port side, a number of the MZIs disposed in the branch ports side being larger than a number of the MZIs disposed in the common port side in the tapering shape of each of the first and second optical switch arrays,
   a first direction which is from the common port to the branch ports of the optical switch included in the first optical switch array and a second direction which is from the common port to the branch ports of the optical switch included in the second optical switch array are arranged to be opposite to each other and in parallel, and
   the number of the MZIs disposed in the common port side in the tapering shape for each of the first and second optical switch arrays is greater than 0.

2. The switch unit according to claim 1, wherein
the common port of the optical switch included in the first optical switch array and the branch ports of the optical switch included in the second optical switch array are connected to a first side face of the substrate, and
the branch ports of the optical switch included in the first optical switch array and the common port of the optical switch included in the second optical switch array are connected to a second side face of the substrate, the second side face being opposite to the first side face.

3. The switch unit according to claim 2, wherein
each of the optical switches further includes a dummy waveguide which is connected to the branch ports and is not connected to the common port, and
the dummy waveguide is connected to a third side face of the substrate, the third side face being different from the first side face and the second side face.

4. The switch unit according to claim 1, wherein
the first optical switch array includes a plurality of the optical switches in which the common ports thereof are arranged in parallel and the branch ports thereof are arranged in parallel, and
the second optical switch array includes a plurality of the optical switches in which the common ports thereof are arranged in parallel and the branch ports thereof are arranged in parallel.

5. The switch unit according to claim 1, wherein
the first optical switch array and the second optical switch array are arranged such that the branch ports of the optical switch included in the first optical switch array and the common port of the optical switch included in the second optical switch array are close to each other.

6. The switch unit according to claim 1, wherein
each of the first and second optical switch arrays has a shape of a substantially right triangle having a base on the branch ports side and being sandwiched from the branch ports side toward the common port side by a hypotenuse and a perpendicular, and
the first optical switch array and the second optical switch array are arranged such that the hypotenuse of the first optical switch array and the hypotenuse of the second optical switch array are close to each other.

7. The switch unit according to claim 1, wherein
the substrate is divided into a first substrate including the first optical switch array and a second substrate including the second optical switch array.

8. The switch unit according to claim 1, further comprising:
   a first electrode pad provided on an opposite side from the second optical switch array with respect to the first optical switch array and connected to the optical switch included in the first optical switch array; and a second electrode pad provided on an opposite side from the first optical switch array with respect to the second optical switch array and connected to the optical switch included in the first optical switch array.

9. The switch unit according to claim 1, wherein
each of the MZIs includes a first waveguide configured not to be heated and a second waveguide configured to be heated, and
in the optical switch included in each of the first and second optical switch arrays, a first distance between the first waveguides adjacent to each other is smaller than a second distance between the second waveguides adjacent to each other.

10. The switch unit according to claim 9, wherein a third distance between the first waveguide that is included in the first optical switch array and is closest to the second optical switch array and the first waveguide that is included in the second optical switch array and is closest to the first optical switch array is larger than the first distance.

11. A switch apparatus comprising:
the switch unit according to-claim 1;
a splitter unit configured to divide the optical signal or join the optical signals; and
an optical fiber connecting the switch unit and the splitter unit.

12. A switch unit for selecting a route for an inputted optical signal and outputting the optical signal, the switch unit comprising:

a substrate; and
first and second optical switch arrays each including an optical switch which includes one common port configured to input and output the optical signal, a plurality of branch ports each configured to input and output the optical signal, a plurality of waveguides connecting the common port and the branch ports, and a plurality of Mach-Zehnder interferometers (MZIs) provided on the waveguides, and which extends along a surface of the substrate, wherein
each of the first and second optical switch arrays has a shape tapering from the branch ports side toward the common port side, a number of the MZIs disposed in the branch ports side being larger than a number of the MZIs disposed in the common port side in the tapering shape of each of the first and second optical switch arrays,
a first direction which is from the common port to the branch ports of the optical switch included in the first optical switch array and a second direction which is from the common port to the branch ports of the optical switch included in the second optical switch array are arranged to be opposite to each other and in parallel, and
the first and second optical arrays are not connected to each other at any point between the common ports and the branch ports.

\* \* \* \* \*